United States Patent
Free et al.

(10) Patent No.: US 9,915,191 B2
(45) Date of Patent: Mar. 13, 2018

(54) AIR INTAKE SYSTEM FOR INTERNAL COMBUSTION ENGINE

(71) Applicant: CUMMINS INC., Columbus, IN (US)

(72) Inventors: Paul Douglas Free, Hope, IN (US); Jason Robert Griffin, Greenwood, IN (US); Alex Edward Priestley, Warwickshire (GB); Stephen Sunadh Gidla, Greenwood, IN (US); Peter Vinson Woon, Columbus, IN (US); Joseph Scot Roederer, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 15/429,108

(22) Filed: Feb. 9, 2017

(65) Prior Publication Data
US 2017/0152791 A1    Jun. 1, 2017

Related U.S. Application Data

(62) Division of application No. 14/489,584, filed on Sep. 18, 2014, now Pat. No. 9,605,630, which is a division
(Continued)

(51) Int. Cl.
*F02M 35/10* (2006.01)
*F02M 31/00* (2006.01)
(Continued)

(52) U.S. Cl.
CPC .............. *F02B 31/04* (2013.01); *F02B 75/22* (2013.01); *F02F 1/4235* (2013.01);
(Continued)

(58) Field of Classification Search
CPC ........ Y02T 10/146; F02B 75/22; F02B 31/04; F02M 35/112; F02M 35/1045;
(Continued)

(56) References Cited

U.S. PATENT DOCUMENTS

| | | | |
|---|---|---|---|
| 2,423,602 A | 7/1947 | Magdeburger | |
| 4,274,386 A * | 6/1981 | Reyes | F02M 29/06 123/590 |

(Continued)

FOREIGN PATENT DOCUMENTS

| | | |
|---|---|---|
| CN | 101074639 | 11/2007 |
| DE | 195 17 079 | 11/1996 |

(Continued)

OTHER PUBLICATIONS

Supplemental European Search Report dated Jul. 4, 2016 in EP application No. 14756503.0.
(Continued)

*Primary Examiner* — Syed O Hasan
(74) *Attorney, Agent, or Firm* — Faegre Baker Daniels LLP (57) ABSTRACT

An intake manifold is provided that controls swirl on entry to a combustion chamber. Each intake manifold includes a fin or rib portion positioned to reduce or eliminate swirl induced by the configuration of the intake manifold, particularly when used in a large engine having a left bank and a right bank of combustion chambers. By controlling swirl induced by the intake manifold, swirl consistency is improved between engine cylinders and between the left bank and the right bank, improving the consistency of power output and reducing emissions, particularly particulate emissions, also called smoke.

9 Claims, 8 Drawing Sheets

Related U.S. Application Data of application No. 13/782,997, filed on Mar. 1, 2013, now Pat. No. 8,844,492.

(51) Int. Cl.
*F02B 31/04* (2006.01)
*F02M 35/116* (2006.01)
*F02B 75/22* (2006.01)
*F02F 1/42* (2006.01)
*F02M 35/104* (2006.01)

(52) U.S. Cl.
CPC .. *F02M 35/1045* (2013.01); *F02M 35/10262* (2013.01); *F02M 35/116* (2013.01)

(58) Field of Classification Search
CPC ....... F02M 35/10072; F02M 35/10354; F02M 35/10118; F02M 35/10262; F02M 29/06; F02M 35/10; F02M 35/116; F02F 1/4235
USPC .................. 123/184.21, 184.31–184.46, 306
See application file for complete search history.

(56) References Cited

U.S. PATENT DOCUMENTS

| | | | |
|---|---|---|---|
| 4,389,988 A | 6/1983 | Ong | |
| 4,553,507 A | 11/1985 | Shaffer | |
| 4,766,866 A | 8/1988 | Takii et al. | |
| 5,632,145 A | 5/1997 | Hunt | |
| 5,685,281 A | 11/1997 | Li | |
| 5,924,398 A * | 7/1999 | Choi | F02D 9/104 123/184.21 |
| 6,173,695 B1 | 1/2001 | Davis et al. | |
| 7,556,031 B2 | 7/2009 | Russell | |
| 8,844,492 B2 | 9/2014 | Free et al. | |
| 2003/0168033 A1 | 9/2003 | Hunt et al. | |
| 2004/0221830 A1 | 11/2004 | Kuehner et al. | |
| 2006/0048738 A1 | 3/2006 | Isaji et al. | |
| 2007/0261680 A1 | 11/2007 | Farrell et al. | |
| 2008/0041352 A1 | 2/2008 | Bolanos | |
| 2009/0272356 A1 | 11/2009 | Abe et al. | |
| 2010/0300392 A1 | 12/2010 | Cheung et al. | |
| 2011/0232604 A1 | 9/2011 | Russell | |
| 2013/0228146 A1* | 9/2013 | Emler | F02M 35/10 123/184.21 |

FOREIGN PATENT DOCUMENTS

| | | |
|---|---|---|
| DE | 10 2006 025889 | 12/2007 |
| WO | 85/01778 | 4/1985 |
| WO | 2007/030933 | 3/2007 |

OTHER PUBLICATIONS

International Search Report dated Jun. 20, 2014 in corresponding International Application PCT/US2014/019383.

H. Soltanipour et al., "Numerical Analysis of Heat Transfer Enhancement with the Use of y-AL203/Water Nanofluid and Longitudinal Ribs in a Curved Duct", Thermal Science, 2012, vol. 16, No. 2, pp. 469-480.

S.K. Rout et al., "Numerical Analysis of Mixed Convection through an Internally Finned Tube", Advances in Mechanical Engineering, vol. 2012, Article ID 918342, 10 pages.

Chinese Office Action dated May 25, 2017 in corresponding Chinese Application No. 201480011353.X (English language translation).

European Office Action dated Jul. 10, 2017 in corresponding EP Application No. 14 756 503.0.

* cited by examiner

AIR INTAKE SYSTEM FOR INTERNAL COMBUSTION ENGINE

PRIORITY

The present application is a divisional of U.S. patent application Ser. No. 14/489,584 titled AIR INTAKE SYSTEM FOR INTERNAL COMBUSTION ENGINE filed Sep. 18, 2014, which is a divisional of U.S. patent application Ser. No. 13/782,997 titled AIR INTAKE SYSTEM FOR INTERNAL COMBUSTION ENGINE, filed Mar. 1, 2013, the priority of which is hereby claimed and the disclosures of which are hereby incorporated by reference.

TECHNICAL FIELD

This disclosure relates to an air intake system for internal combustion engines, and more particularly to an air intake system, including fin or rib portions positioned at an interface between the air intake system and a combustion chamber of the internal combustion engine, where the fin or rib portions may be integrated into the air intake system.

BACKGROUND

Internal combustion engines require intake air be introduced in a combustion chamber as part of a combustion process. The intake air is typically introduced in the combustion chamber in a way that causes the intake air to swirl in the combustion chamber, which helps to mix the air and fuel introduced to the combustion chamber. Uniform and consistent mixing of intake air provides consistent power output from each combustion chamber and can provide decreased emissions, especially decreased particulate emissions, also described as smoke.

SUMMARY

This disclosure provides an internal combustion engine comprising an engine body, a first intake manifold and a second intake manifold. The engine body includes a plurality of left bank combustion chambers and a plurality of right bank combustion chambers. The first intake manifold is positioned on the left bank side and the second intake manifold is positioned on the right bank side. Each of the first and second intake manifolds is attached to the engine body. Each of the first and second intake manifolds includes a longitudinally extending airflow passage, a body interior surface forming the longitudinally extending airflow passage, a plurality of inlet openings formed in the body interior surface, a plurality of outlet openings, and a plurality of transverse airflow passages. Each of the plurality of transverse airflow passages extends between at least one of the plurality of inlet openings and at least one of the plurality of outlet openings and includes a longitudinal transverse passage axis and a passage interior surface. Each of the first and second intake manifolds further includes at least one fin portion extending radially inward from the passage interior surface into each of the plurality of transverse airflow passages and extending in a direction along the longitudinal transverse passage axis. The longitudinal transverse passage axis is curved to form a transverse passage angle and the transverse airflow passage is positioned to intersect the longitudinally extending airflow passage at a transverse passage connection angle.

This disclosure also provides an internal combustion engine comprising an engine body, a first intake manifold, a second intake manifold, and a spacer portion. The engine body includes a plurality of left bank combustion chambers and a plurality of right bank combustion chambers The first intake manifold is positioned on the left bank side and the second intake manifold positioned on the right bank side. Each of the first and second intake manifolds is attached to the engine body. Each of the first and second intake manifolds includes a longitudinally extending airflow passage, a body interior surface forming the longitudinally extending airflow passage, a plurality of inlet openings formed in the body interior surface, a plurality of outlet openings, and a plurality of transverse airflow passages. Each of the plurality of transverse airflow passages extends between one of the plurality of inlet openings and one of the plurality of outlet openings and includes a longitudinal transverse passage axis. The longitudinal transverse passage axis is curved to form a transverse passage angle, and the transverse airflow passage is positioned to intersect the longitudinally extending airflow passage at a transverse passage connection angle. A spacer portion is positioned between the first intake manifold and the engine body and a spacer portion is positioned between the second intake manifold and the engine body. Each spacer portion includes a plurality of spacer passages and at least one fin portion. The plurality of spacer passage is positioned to connect the plurality of transverse airflow passages to the engine body. The at least one fin portion extends from the spacer portion into each transverse airflow passage in a direction along the longitudinal transverse passage axis.

This disclosure also provides an internal combustion engine comprising an engine body, a first intake manifold, a second intake manifold, and a fin insert portion. The engine body includes a plurality of left bank combustion chambers and a plurality of right bank combustion chambers. The first intake manifold is positioned on the left bank side and the second intake manifold is positioned on the right bank side. Each of the first and second intake manifolds is attached to the engine body. Each of the first and second intake manifolds includes a longitudinally extending airflow passage, a body interior surface forming the longitudinally extending airflow passage, a plurality of inlet openings formed in the body interior surface, a plurality of outlet openings, and a plurality of passage interior surfaces, each passage interior surface forming a transverse airflow passage. Each of the plurality of transverse airflow passages extends between at least one of the plurality of inlet openings and at least one of the plurality of outlet openings. Each of the plurality of transverse airflow passage includes a longitudinal transverse passage axis and includes at least one groove formed in each passage interior surface and extending in a direction along the longitudinal transverse passage axis. The longitudinal transverse passage axis is curved to form a transverse passage angle. The transverse airflow passage is positioned to intersect the longitudinally extending airflow passage at a transverse passage connection angle. The fin insert portion is positioned in the at least one groove. The fin insert portion extends radially inward from the passage interior surface into the transverse airflow passage.

This disclosure also provides an internal combustion engine comprising an engine body, a first intake manifold, a second intake manifold, at least one groove, and a fin insert. The engine body includes a plurality of left bank combustion chambers, a plurality of right bank combustion chambers, and a plurality of cylinder heads positioned to cover the left bank combustion chambers and the right bank combustion chambers. Each of the plurality of cylinder heads includes a plurality of head inlet openings and a plurality of head interior surfaces, each head interior surface forming a head passage, each head passage including a longitudinal head passage axis and connecting at least one head inlet opening to at least one combustion chamber. The first intake manifold is positioned on the left bank side and the second intake manifold is positioned on the right bank side. Each of the first and second intake manifolds is attached to the engine body and includes a longitudinally extending airflow passage, a body interior surface forming the longitudinally extending airflow passage, a plurality of inlet openings formed in the body interior surface, a plurality of outlet openings, and a plurality of passage interior surfaces. Each passage interior surface forms a transverse airflow passage. Each transverse airflow passage extends between at least one of the plurality of inlet openings and at least one of the plurality of outlet openings and includes a longitudinal transverse passage axis. The longitudinal transverse passage axis curves to form a transverse passage angle. The transverse airflow passage is positioned to intersect the longitudinally extending airflow passage at a transverse passage connection angle. Each outlet opening is positioned to connect at least one longitudinally extending airflow passage with at least one head passage. The at least one groove is formed in at least one of each group including the passage interior surface and the head interior surface extending between each inlet opening and each combustion chamber. The at least one groove extends in a direction along at least one of the longitudinal transverse passage axis and the longitudinal head passage axis. The fin insert portion is positioned in the at least one groove, the fin insert portion extends radially inward from at least one of the passage interior surface and the head interior surface into the respective transverse airflow passage or head passage.

Advantages and features of the embodiments of this disclosure will become more apparent from the following detailed description of exemplary embodiments when viewed in conjunction with the accompanying drawings.

DETAILED DESCRIPTION

Figure 1:
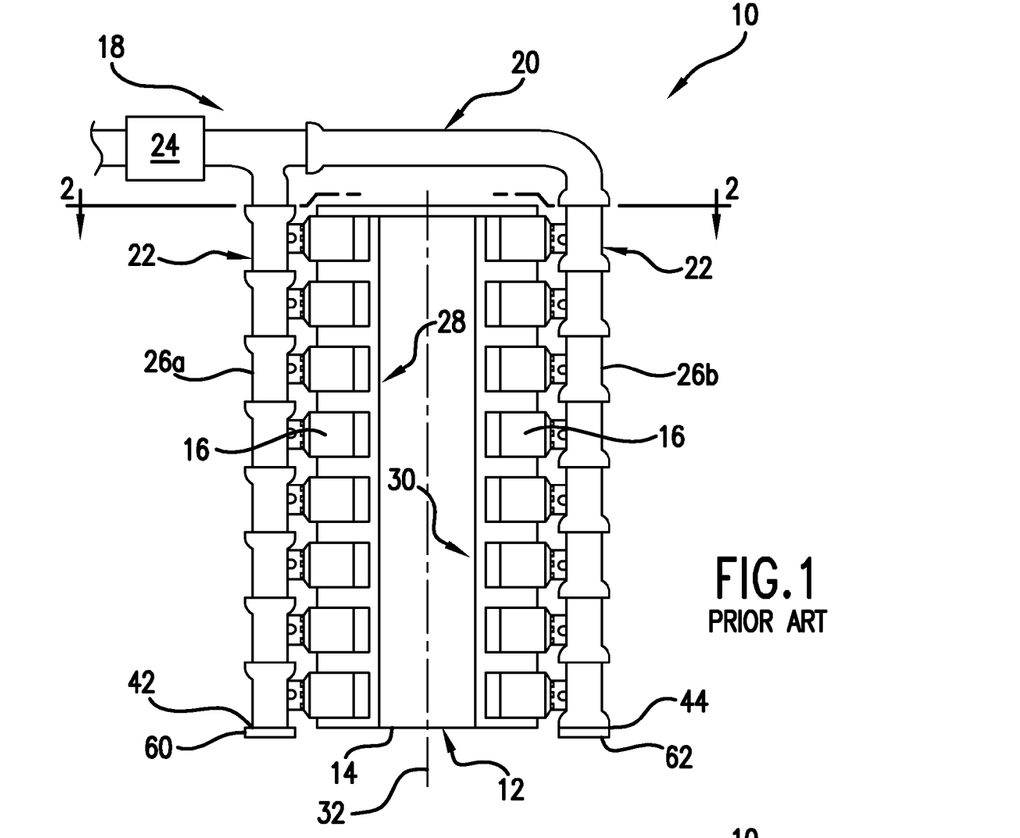
FIG. 1 is a plan view of a portion of a first conventional internal combustion engine.

Referring to FIG. 1, a portion of an internal combustion engine is shown as a simplified schematic and generally indicated at 10. Engine 10 includes an engine body 12, which includes an engine block 14 and a plurality of cylinders (not shown). Engine body 12 also includes a plurality of cylinder heads 16, each of which covers one cylinder and works with other elements of engine body 12 to form a plurality of combustion chambers. Engine 10 also includes an air intake system 18, which includes an intake air circuit 20 and a pair of intake manifolds 22 positioned along intake air circuit 20. Each intake manifold 22 being attached to engine body 12. Air intake system 18 may also include a turbocharger 24 positioned along intake air circuit 20. Each intake manifold 22 includes a plurality of identically configured intake manifold portions 26a and 26b. The combustion chambers, cylinder heads 16, and intake manifold portions 26a are arrayed in a left bank or side 28 and the combustion chambers, cylinder heads 16, and intake manifold portions 26b a right bank or side 30, which may form a "V" configuration or a straight configuration. Left bank 28 and right bank 30 are arranged on opposite sides of a vertically extending engine body plane 32. Engine 10 may include other elements and systems (not shown), such as a fuel system, an exhaust system, a control system, and an aftertreatment system.

Engine 10 is of a size class that has relatively low volume production. To minimize cost in engines having relatively low production volume, intake manifold portions 26a and 26b are identically configured, and cylinder heads 16 are identically configured. In the context of this disclosure, "identically configured" means that each intake manifold portion 26a and 26b has similarly oriented airflow passages, and similarly configured mounting locations. Because of the identical configuration, each intake manifold portion 26a and 26b is interchangeable with any other intake manifold portion 26a or 26b. Each intake manifold portion 26a or 26b is fluidly connected to one combustion chamber. Each intake manifold portion 26a or 26b may be directly attached to one cylinder head 16. In the exemplary embodiment, each intake manifold portion 26a or 26b is connected to at least one adjacent intake manifold portion 26a or 26b. Regardless of engine size, it is important for airflow into the combustion chambers to provide consistent air motion as intake air flows into the combustion chambers to provide similar output power between combustion chambers and to have a uniform flow of emissions from the engine and, if applicable, into the aftertreatment system so that the aftertreatment system is able to remove or neutralize emissions optimally. The applicant has determined through extensive experimentation and modeling that the configuration of intake manifold portions 26a and 26b leads to a difference between the amount of swirl in left bank 28 and the amount of swirl in right bank 30. By modifying the intake manifold portions from those of the prior art, the applicant has developed intake manifold portions that provide significant improvements in swirl uniformity in the combustion chambers of left bank 28 and right bank 30. By optimizing the amount of swirl in the combustion chamber, particulate emissions, also called smoke, is minimized, and consistency of power output is improved cylinder to cylinder and between left bank 28 and right bank 30.

Figure 3:
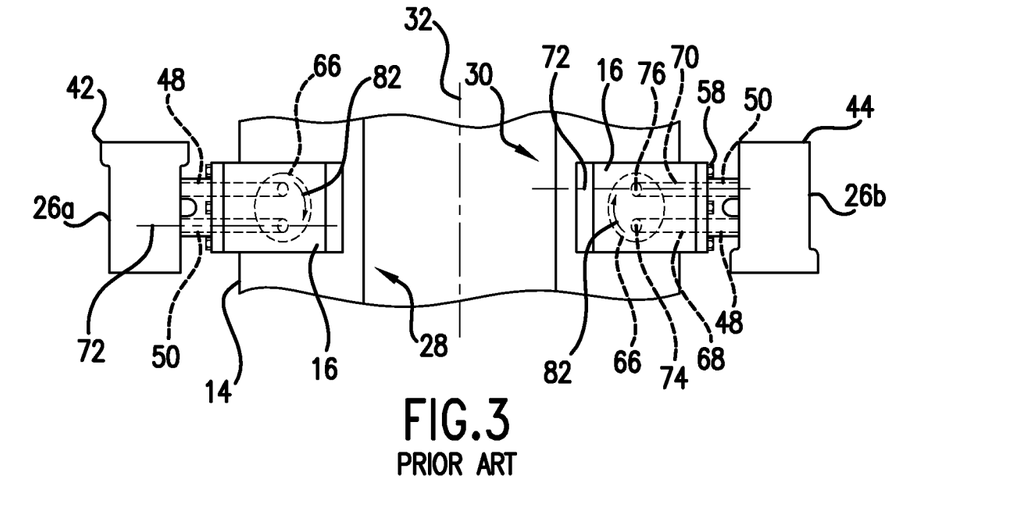
FIG. 3 is a plan view of a cylinder head and an intake manifold portion from a left bank side of the internal combustion engine of FIG. 1, and a cylinder head and an intake manifold from a right bank side of the internal combustion engine of FIG. 1.
Figure 4:
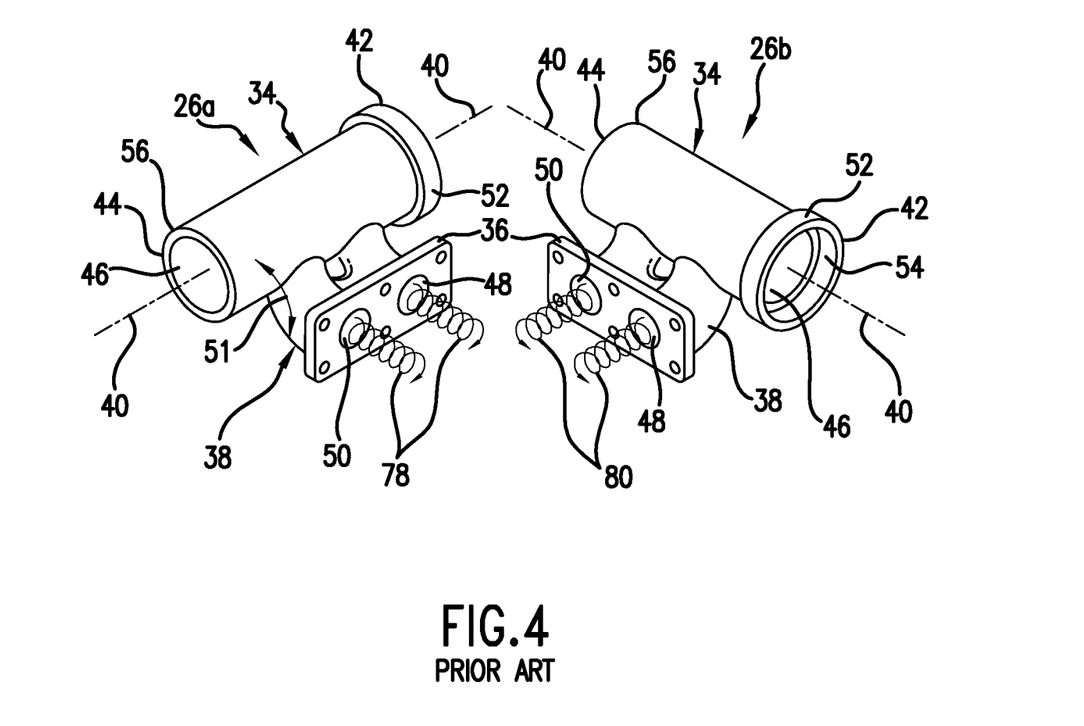
FIG. 4 is a perspective view of one left bank intake manifold portion and one right bank intake manifold portion of FIG. 3 showing a stylized airflow from each intake manifold portion.

Referring to FIG. 3, a portion of left bank 28 and a portion of right bank 30 are shown. As described hereinabove, and as particularly shown in FIG. 4, each intake manifold portion 26a and 26b is identically configured. Each intake manifold portion 26a and 26b includes a body portion 34, a plate portion 36, and a connection portion 38 connecting plate portion 36 to body portion 34. Body portion 34 includes body longitudinal axis 40, a first end 42, a second end 44 and a longitudinal airflow passage 46 extending along longitudinal axis 40 from first end 42 to second end 44. Second end 44 includes an external or outside diameter 56. Each intake manifold portion 26a and 26b further includes a first transverse airflow passage 48 and a second transverse airflow passage 50 that extend from plate portion 36 through connection portion 38 to connect to longitudinal airflow passage 46. First transverse airflow passage 48 and second transverse airflow passage 50 connect to longitudinal airflow passage 46 at a transverse passage connection angle 51 that in the exemplary embodiment is about 90 degrees.

Figure 2:
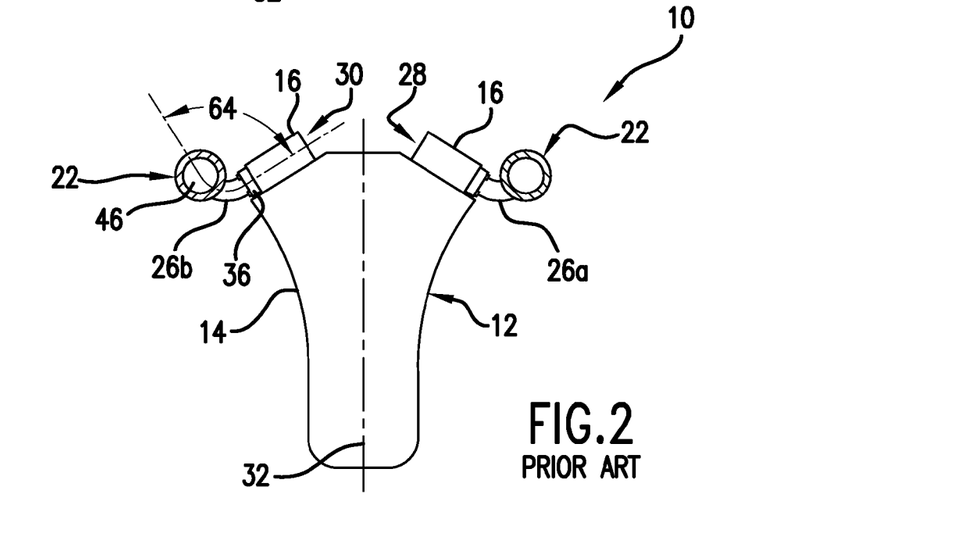
FIG. 2 is an end elevation view of the internal combustion engine of FIG. 1 along the lines 2-2.

First end 42 includes a flange portion 52 that includes an internal or inside diameter 54 sized to accept outside diameter 56 of second end 44, which permits inserting second end 44 of one intake manifold portion 26a or 26b within first end 42 of another intake manifold portion 26a or 26b. When each intake manifold portion 26a or 26b is positioned on engine 10, each plate portion 36 is secured to one cylinder head 16 and may be held in place by a plurality of fasteners 58, clamps, or other mechanisms. Each second end 44 is positioned within first end 42 of an adjacent intake manifold portion 26a or 26b, within another element of intake circuit 20, or covered by a cap 60, as shown in FIG. 1. Each connection to second end 44 is sealed using a gasket material, or may be sealed using other techniques, such as welding. Similarly, each first end 42 connects to or mates with second end 44 of an adjacent intake manifold portion 26a or 26b, connects to or mates with another element of intake circuit 20, or is covered by a cap 62, as shown in FIG. 1. Each connection to first end 42 is sealed using a gasket material, or may be sealed using other techniques, such as welding. In order to keep engine 10 compact to meet customer expectations, intake manifolds 22 are located in a position that requires connection portion 38 to be curved or curvilinear and to form a transverse passage angle 64, as shown in FIG. 2. The configuration of connection portion 38 thus causes first transverse airflow passage 48 and second transverse airflow passage 50 to be curved or curvilinear and to include transverse passage angle 64. In an exemplary embodiment, transverse passage angle 64 may be in the range 70 degrees to 135 degrees.

As described hereinabove, each cylinder head 16 is attached to or mounted on engine block 14 and covers a combustion chamber, a portion of which may be seen in FIG. 3 as a hidden line and generally indicated at 66. Cylinder head 16 also includes a first head passage 68 and a second head passage 70. First head passage 68 connects first transverse airflow passage 48 to combustion chamber 66. First head passage 68 extends generally along a flat plane until it connects with combustion chamber 66 at one side of combustion chamber 66 at a first chamber opening 74. Second head passage 70 connects second transverse airflow passage 50 to combustion chamber 66. Second head passage 70 extends along a flat plane 72, but prior to opening into combustion chamber 66, second head passage 70 extends in a clockwise direction from flat plane 72, connecting to combustion chamber 66 at a second chamber opening 76, when viewing engine 10 from the direction shown in FIGS. 1 and 3.

When engine 10 operates, outside or external air flows from an intake opening (not shown) into intake air circuit 20. The air may flow through one or more filters (not shown) and, in the exemplary embodiment, through turbocharger 24. Intake air then flows into intake manifolds 22, one at left bank 28 and one at right bank 30. Though not shown, air may also flow through a charge air cooler and through other elements upstream from intake manifolds 22. Once in intake manifold 22, the intake air flows into each intake manifold portion 26a or 26b through longitudinal airflow passage 46. In left bank 28, air flows into longitudinal airflow passage 46 from first end 42 of each intake manifold portion 26a. Air then flows into first transverse airflow passage 48 and second transverse airflow passage 50 of intake manifold portion 26a, moving through a first angle, which is transverse passage connection angle 51. As the airflow passes through first transverse airflow passage 48 and through second transverse airflow passage 50, the airflow flows through a second angle, which is transverse passage angle 64. Airflow exiting intake manifold portion 26a through plate portion 36 is shown as a stylized line and indicated at 78 in FIG. 4.

In right bank 30, air flows into longitudinal airflow passage 46 from second end 44 of each intake manifold portion 26b. Air then flows into first transverse airflow passage 48 and second transverse airflow passage 50 of intake manifold portion 26b, moving through a first angle, which is transverse passage connection angle 51. As the airflow passes through first transverse airflow passage 48 and through second transverse airflow passage 50, the airflow flows through a second angle, which is transverse passage angle 64. Airflow exiting intake manifold portion 26b through plate portion 36 is shown as a stylized line and indicated at 80 in FIG. 4. Airflow exiting intake manifold portions 26a and 26b enters first head passage 68 and second head passage 70 of each respective cylinder head 16. The airflow enters combustion chamber 66 from first chamber opening 74 of first head passage 68 and from second chamber opening 76 of second head passage 70. The effect of the position of first chamber opening 74 and second chamber opening 76 with respect to combustion chamber 66 is to induce a clockwise combustion chamber swirl to intake air flowing into combustion chamber 66 when viewing engine 10 from the direction shown in FIGS. 1 and 3, indicated at 82 in FIG. 3.

Engine 10 works well for its intended purpose, but engine 10 has challenges. Applicant recognized that one challenge with engine 10 is that output power and emissions between left bank 28 and right bank 30 are different. What was not understood was the reason for the differences between left bank 28 and right bank 30. Applicant analyzed and tested each individual component of left bank 28 and right bank 30 extensively. What the Applicant unexpectedly learned is that airflow 78 exits intake manifold portion 26a with a clockwise rotation and airflow 80 exits intake manifold portion 26b with a counterclockwise rotation. This rotation is caused by the airflow changing direction a first time through transverse passage connection angle 51 and a second time through transverse passage angle 64. Because the direction of transverse passage angle 64 is opposed on opposite sides of engine 10, i.e., the left side and the right side, the direction of airflow rotation that enters combustion chamber 66 from first head passage 68 and second head passage 70 is also opposite on the left side and the right side, i.e., clockwise versus counterclockwise. Applicant also learned that the direction of rotation of airflow 78 and airflow 80 affected the amount of swirl in combustion chambers 66.

In one engine configuration, the amount of swirl from airflow into each left bank 28 combustion chamber was 20% higher than expected. The amount of swirl from airflow into each right bank 30 combustion chamber 66 was 30% lower than expected. Thus, the swirl in right bank 30 was more than 40% different from the swirl in left bank 28. Thus, because of the rotation induced by longitudinal airflow passage 46, first transverse airflow passage 48, and second transverse airflow passage 50, the swirl, also called flow vortices, in each combustion chamber 66 in left bank 28 was actually 20% higher than would be expected if no swirl was introduced by travel through the aforementioned passages. Furthermore, the swirl in each combustion chamber 66 in right bank 30 was actually 30% lower than would be expected if no swirl was introduced by travel through the aforementioned passages. As noted hereinabove, if swirl or flow vortices are too high or too low, smoke emissions increase and power varies between left bank 28 and right bank 30. Thus, the difference in swirl between left bank 28 and right bank 30 was undesirably causing increased particulate emissions and causing undesirable power variations. Flow vortices may also be different from cylinder to cylinder in the same bank, but these differences are typically much less than the difference between banks.

To reduce the amount of airflow rotation induced by the configuration of intake manifold portions 26a and 26b, applicant determined that one or more fin or rib portions placed in first transverse airflow passage 48 and in second transverse airflow passage 50 reduced the rotation of air flowing from first transverse airflow passage 48 and second transverse airflow passage 50 to nearly zero. By reducing the airflow rotation to nearly zero, the swirl in the left bank and right bank combustion chambers became nearly equal, which improved the uniformity of mixing of air and fuel between left bank 28 and right bank 30. The improved mixing improved the consistency of power output from left bank 28 and right bank 30 as well as the level of emissions from left bank 28 and right bank 30, nearly eliminating the previously observed differences.

Figure 20:
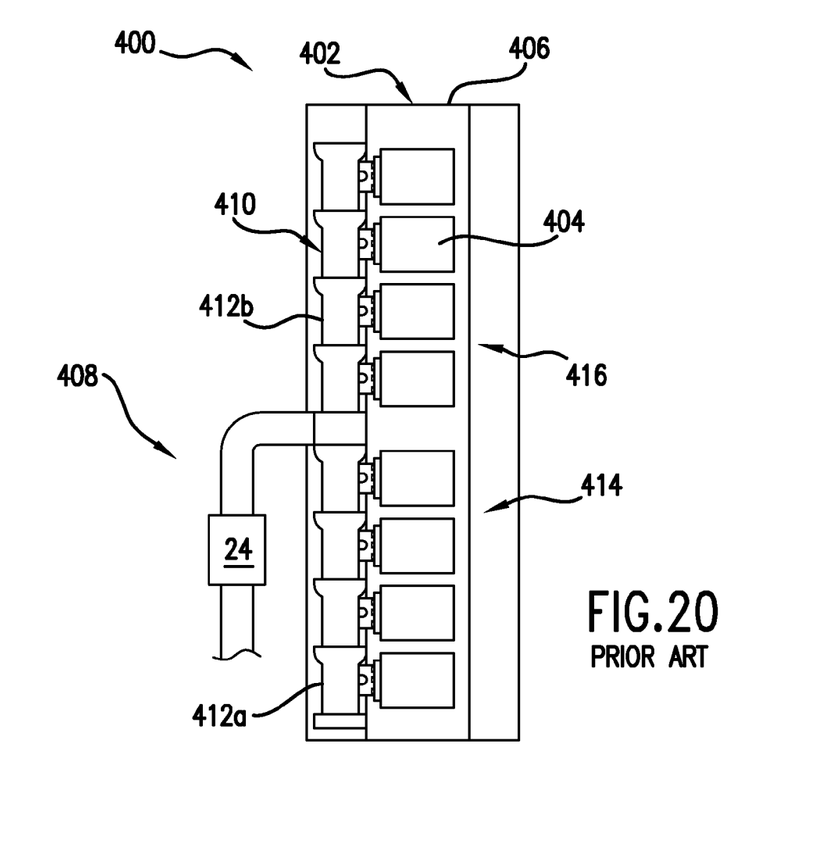
FIG. 20 is a plan view of a portion of a second conventional internal combustion engine.

While internal combustion engine 10 shows a side-by-side configuration for left bank 28 and right bank 30, the definition of left and right bank refers as much to the orientation of airflow through an intake manifold portion as it does to a physical left bank and right bank position. FIG. 20 shows a conventional internal combustion engine 400 including an engine body 402, which further includes a cylinder block 406 to which are attached one or more cylinder heads 404. An air intake system 408 functions similar to intake system 18 of FIG. 1. Intake system 408 includes an intake manifold 410 including a plurality of intake manifold portions 412a and 412b that may be similar to intake manifold portions 26a and 26b. Because air intake system 408 connects to intake manifold 410 in a central location, intake manifold 410 is divided into a left bank 414 and a right bank 416, with air flow through intake manifold portions 412a as previously described for intake manifold portions 26a for left bank 28 and air flow through intake manifold portions 412b as previously described for intake manifold portions 26b for right bank 30. Thus, an inline internal combustion engine may have a left bank and right bank from the perspective of airflow.

Figure 5:
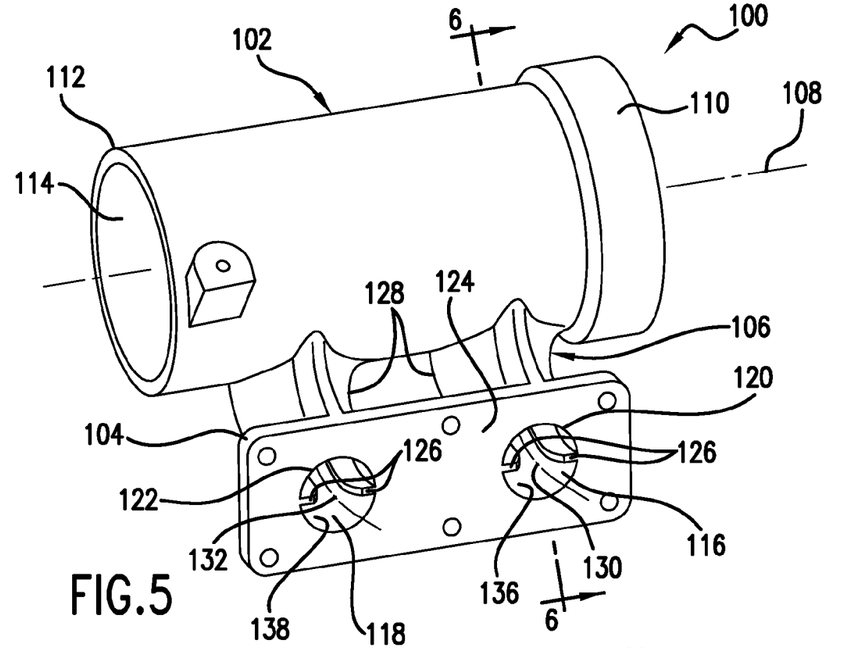
FIG. 5 is a perspective view of an intake manifold portion in accordance with a first embodiment of the present disclosure.
Figure 6:
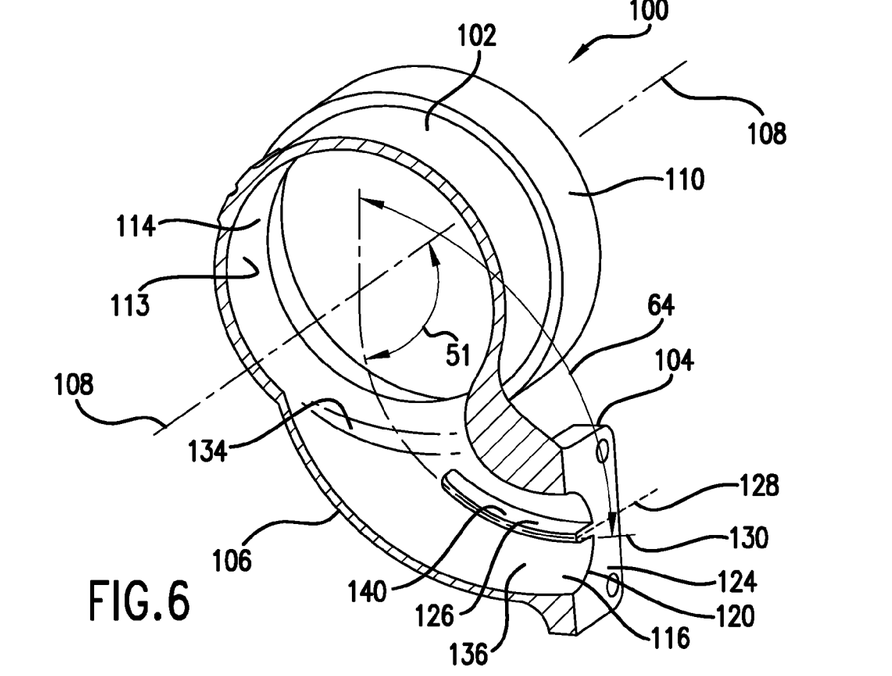
FIG. 6 is a perspective sectional view of the intake manifold portion of FIG. 5 along the lines 6-6 in FIG. 5.

Referring to FIGS. 5 and 6, a first exemplary embodiment intake manifold portion 100 of the present disclosure is shown. As with intake manifold portions 26a and 26b, intake manifold portion 100 includes a body portion 102, a plate portion 104 having an exterior surface 124, and a connection portion 106 extending from body portion 102 to plate portion 104. Intake manifold portion 100 also includes a body longitudinal axis 108, a first end 110, a second end 112, and a body interior surface 113 that forms a longitudinal airflow passage 114 extending along body longitudinal axis 108. Intake manifold portion 100 also includes a first inlet opening 134 formed in body interior surface 113 and a first outlet opening 120 formed in exterior surface 124 of plate portion 104, and a first passage interior surface 136 that forms a first transverse airflow passage 116 positioned or extending between first inlet opening 134 and first outlet opening 120. Thus, first inlet opening 134 is at a first end of first transverse airflow passage 116 and first outlet opening 120 is at a second end of first transverse airflow passage 116. Intake manifold portion 100 further includes a second inlet opening (not shown) formed in body interior surface 113 and a second outlet opening 122 formed in exterior surface 124 of plate portion 104, and a second passage interior surface 138 that forms a second transverse airflow passage 118 positioned or extending between the second inlet opening and second outlet opening 122. Thus, the second inlet opening is at a first end of second transverse airflow passage 118 and second outlet opening 122 is at a second end of second transverse airflow passage 118. First transverse airflow passage 116 includes a longitudinal first transverse passage axis 130 that extends through the center of first transverse airflow passage 116 between first inlet opening 134 and first outlet opening 120. Second transverse airflow passage 118 includes a longitudinal second transverse passage axis 132 that extends through the center of first transverse airflow passage 116 between the second inlet opening and second outlet opening 122. Each longitudinal transverse passage axis extends at transverse passage connection angle 51 to longitudinal airflow passage 114, and an extension of each longitudinal transverse passage axis may intersect body longitudinal axis 108. In an exemplary embodiment, transverse passage connection angle 51 is 90 degrees, but may be at other angles. Each transverse airflow passage extends through connection portion 106 to plate portion 104. First transverse passage axis 130 extends from plate portion 104 at transverse passage angle 64 to the portion of transverse passage axis 130 that extends into longitudinal airflow passage 114 or that may intersect body longitudinal axis 108. When intake manifold portion 100 is positioned on engine body 12, first outlet opening 120 and second outlet opening 122 are in fluid communication with combustion chamber 66, thus providing a flow path for intake air to reach combustion chamber 66.

Intake manifold portion 100 further includes at least one fin or rib portion 126 formed in at least one of plate portion 104 and connection portion 106. Each fin or rib portion 126 extends radially inward from either first passage interior surface 136 into first transverse airflow passage 116 and toward first transverse passage axis 130, or from second passage interior surface 138 into second transverse airflow passage 118 and toward second transverse passage axis 132. Each fin or rib portion 126 extends in a direction that is longitudinally along a respective transverse airflow passage, i.e., in the same direction that either first transverse passage axis 130 or second transverse passage axis 132 of the respective transverse airflow passage extends. Airflow also flows through first transverse airflow passage 116 along first transverse passage axis 130 toward combustion chamber 66 and through second transverse airflow passage 118 along second transverse passage axis 132 toward combustion chamber 66. For ease of casting, each fin or rib portion 126 may follow a casting parting line 128 that may be formed during fabrication of intake manifold portion 100. In the exemplary embodiment, first transverse airflow passage 116 includes a pair of oppositely disposed, horizontally extending co-planar fin portions 126, and second transverse airflow passage 118 includes a pair of oppositely disposed, horizontally extending co-planar fin portions 126. In the exemplary embodiment, each fin portion 126 in the left bank is co-planar with all other fin portions 126 in the left bank or side, and each fin portion 126 is co-planar with all other fin portions 126 in the right bank or side. However, in the exemplary embodiment, each fin portion 126 in one bank is not co-planar with any fins in an opposite bank, though they may be in another embodiment. Because fin portions 126 extend either along the first transverse passage axis 130 of first transverse airflow passage 116 or along second transverse passage axis 132 of second transverse airflow passage 118, fin portions 126 may have a curvature 140, which may be seen in FIG. 6. Fin portions 126 are disposed closer to either first outlet opening 120 or second outlet opening 122 than to first inlet opening 134 and the second inlet opening (not shown) because the swirl vortices are greater after each transverse airflow passage has extended through curvilinear transverse passage angle 64. In addition, positioning fin portions 126 closer to an outlet opening may make forming fin portions 126 during manufacturing easier. In the exemplary embodiment shown in FIG. 6, fin portions 126 extend longitudinally from either first outlet opening 120 or second outlet opening 122.

In the following embodiments, elements having the same number as the first exemplary embodiment function similar to the first exemplary embodiment and any description of previously described elements is for the purpose of clarity.

Figure 7:
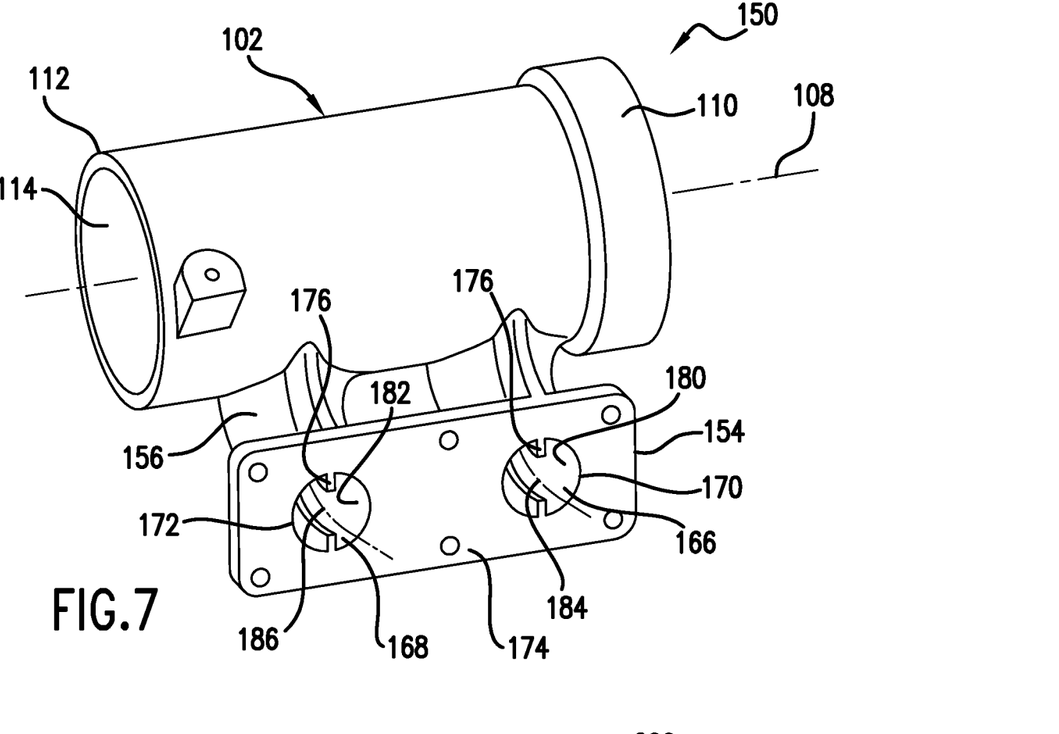
FIG. 7 is a perspective view of an intake manifold portion in accordance with a second embodiment of the present disclosure.

Referring to FIG. 7, a second exemplary embodiment intake manifold portion 150 is shown. As with intake manifold portions 26a, 26b, and 100, intake manifold portion 150 includes body portion 102, a plate portion 154 having an exterior surface 174, and a connection portion 156 extending from body portion 102 to plate portion 154. Intake manifold portion 150 also includes a first inlet opening (not shown) similar to inlet opening 134 and a first outlet opening 170 formed in exterior surface 174 of plate portion 154, and a first passage interior surface 180 that forms a first transverse airflow passage 166 positioned or extending between the first inlet opening and first outlet opening 170. Intake manifold portion 150 further includes a second inlet opening (not shown) similar to that described hereinabove and a second outlet opening 172 formed in exterior surface 174 of plate portion 154, and a second passage interior surface 182 that forms a second transverse airflow passage 168 positioned or extending between the second inlet opening and second outlet opening 172. First transverse airflow passage 166 includes a longitudinal first transverse passage axis 184 that extends between the first inlet opening and first outlet opening 170. Second transverse airflow passage 168 includes a longitudinal second transverse passage axis 186 that extends between the second inlet opening and second outlet opening 172. Each transverse airflow passage extends through connection portion 156 to plate portion 154.

Intake manifold portion 150 further includes at least one fin or rib portion 176 formed in at least one of plate portion 154 and connection portion 156. Each fin or rib portion 176 extends radially inward from either first passage interior surface 180 into either first transverse airflow passage 166 or from second passage interior surface 182 into second transverse airflow passage 168. Each fin or rib 176 may be oriented in a direction perpendicular to the direction of ribs 126 in the previous embodiment, and thus may be oriented in a generally vertical direction. In the exemplary embodiment, each fin or rib 176 is parallel to all other fin or rib portions 176 in the left bank or side and the right bank or side. Each fin or rib portion 176 extends in a direction that is longitudinally along a respective transverse airflow passage, i.e., in the same direction that either first transverse passage axis 184 or second transverse passage axis 186 of the respective airflow passage extends, which is also the direction of airflow through first transverse airflow passage 166 and second transverse airflow passage 168. In the exemplary embodiment, intake manifold portion 150 includes a pair of oppositely disposed fin portions 176. Fin portions 176 are disposed closer to either first outlet opening 170 or second outlet opening 172 than to the first inlet opening (not shown) and the second inlet opening (not shown) because the swirl vortices are greater after each transverse airflow passage has extended through previously described transverse passage angle 64, and thus fin or rib portions 176 are most effective in that location. In addition, positioning fin or rib portions 176 closer to an outlet opening may make forming fin or rib portions 176 during manufacturing easier. In the exemplary embodiment shown in FIG. 7, fin or rib portions 176 extend longitudinally from either first outlet opening 170 or second outlet opening 172.

Figure 8:
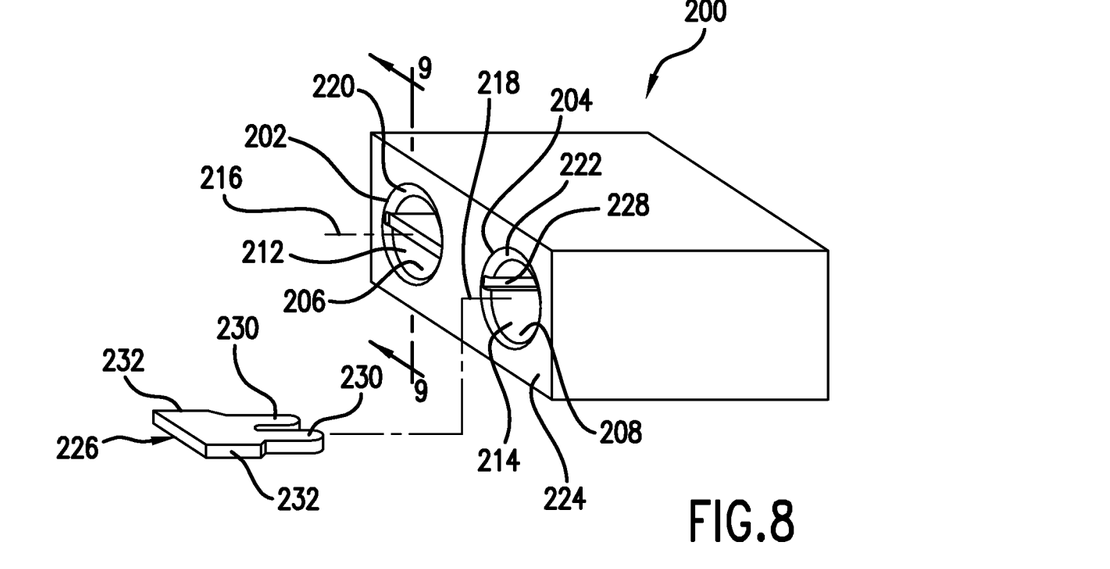
FIG. 8 is a perspective view of a part of a cylinder head in accordance with a third embodiment of the present disclosure.
Figure 9:
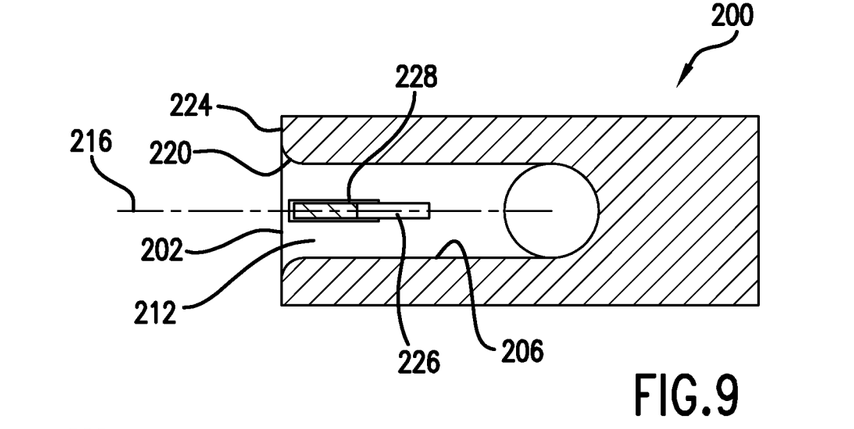
FIG. 9 is a sectional view of the cylinder head of FIG. 8 along the lines 9-9.
Figure 10:
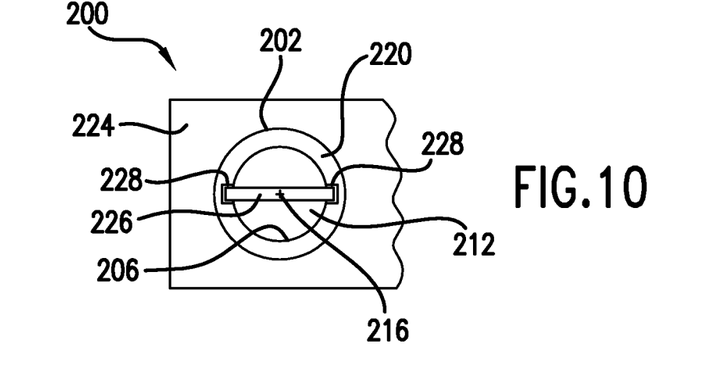
FIG. 10 is an elevation view of a part of the cylinder head of FIG. 8.

Referring to FIGS. 8-10, a cylinder head in accordance with a third exemplary embodiment of the present disclosure is shown and generally indicated at 200. Cylinder head 200 includes an exterior surface 224 and a first head inlet opening 202 and a second head inlet opening 204 formed in exterior surface 224. Cylinder head 200 also includes a first head interior surface 206 extending inwardly from first head inlet opening 202 that forms a first head passage 212. Cylinder head 200 further includes a second head interior surface 208 extending inwardly from second head inlet opening 204 that forms a second head passage 214. First head passage 212 extends from first head inlet opening 202 to a combustion chamber, in a manner that is similar to first head passage 68 shown in FIG. 3. Second head passage 214 extends from second head inlet opening 204 to a combustion chamber, in a manner that is similar to second head passage 70 shown in FIG. 3. First head inlet opening 202 fluidly connects an airflow passage such as first transverse airflow passage 48 to first head passage 212. Second head inlet opening 204 fluidly connects an airflow passage such as second transverse airflow passage 50 to second head passage 214. First head passage 212 includes a longitudinal first head passage axis 216 that extends along first head passage 212, and may be the along the centerline of first head passage 212. Second head passage 218 includes a longitudinal second head passage axis 218 that extends along second head passage 214, and may be along the centerline of second head passage 214.

Cylinder head 200 further includes one or more grooves, slots, or channels 228 formed in first head interior surface 206 and second head interior surface 208. Each groove or slot 228 extends in a direction that is along either first head passage axis 216 or second head passage axis 218. While previously described grooves or slots 228 are described as extending from various openings in the previous embodiments, each groove or slot 228 in the third embodiment extends from a spaced distance from either first head inlet opening 202 or second head inlet opening 204. The reason for the spaced distance is that first head passage 212 includes a bell mouth portion 220 positioned next to or adjacent to first head inlet opening 202 and second head passage 214 includes a bell mouth portion 222 positioned next to or adjacent to second head inlet opening 204. Each groove or slot may be cast within cylinder head 200 or may be machined into cylinder head 200.

A fin insert portion 226 is sized and shaped to mate with grooves 228. Fin insert portion 226 includes a longitudinally extending portion 230, and one or more engaging portions 232 that are sized to mate with grooves 228. Fin insert portion 226 is positioned within at least one groove 228 by installing fin insert portion 226 into first head inlet opening 202 or into second head inlet opening 204. Fin insert portion 226 may be a press fit with groove 228, may be welded into groove 228, or may be secured within groove 228 by other means, which means that one groove 228 may be sufficient to properly position fin insert portion 226. If fin insert portion 226 is a loose or slip fit with a pair of grooves 228, when an intake manifold portion such as intake manifold portion 26a or 26b is attached, mounted or positioned on cylinder head 200, the size and position of intake manifold portion 26a or 26b retains fin insert portion 226 within grooves 228. While fin insert portion 226 may mate with grooves 228 for ease of manufacture, fin insert portion 226 may be held in place by a suitable fixture and then attached to first head interior surface 206 of cylinder head 200 that forms first head passage 212 or second head interior surface 208 that forms second head passage 214 by a weld or by other suitable attachment technique.

Figure 11:
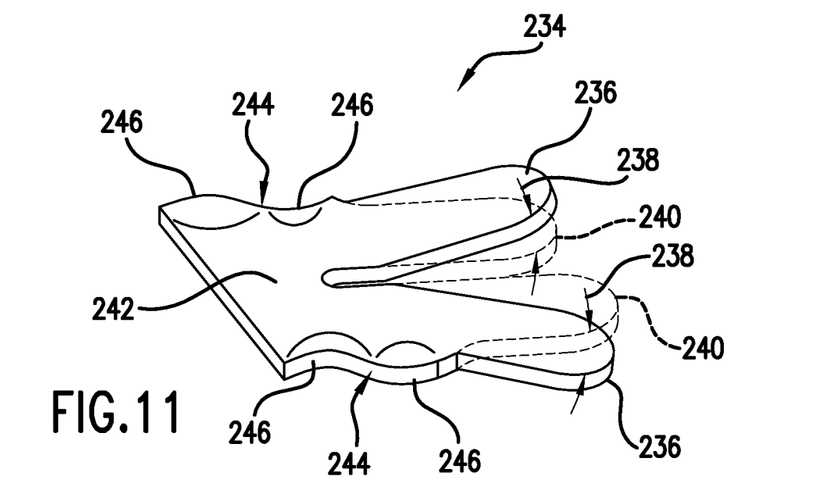
FIG. 11 is a perspective view of a fin insert portion compatible with the cylinder head of FIG. 8 in accordance with a fourth embodiment of the present disclosure.

The configuration of cylinder head 200 provides an opportunity to further control airflow entering combustion chamber 66. As shown in FIG. 11, a fin insert portion 234 in accordance with a fourth exemplary embodiment of the present disclosure includes a flat planar portion 242 and one or more longitudinal portions 236 extending from flat planar portion 242. Flat planar portion 242 includes one or more engaging portions 244 that provide a function similar to previously described engaging portions 232. Engaging portions 232 may include deformed portions 246, which may be in the shape of a sine wave or other deformed configuration. Each deformed portion 246 engages with grooves slots or channels 228 and helps to retain fin insert portions 234 within cylinder head 200.

Each longitudinal portion 236 is deflected, bent, or deformed at an insert angle 238 with respect to a flat or planar location or position 240. In an exemplary embodiment, insert angle 238 is in the range zero to ten degrees, and each longitudinal portion 236 is deflected in a direction that is opposite to the other longitudinal portion 236 formed on fin insert portion 234. In other embodiments, insert angle 238 may be in the range zero to thirty degrees, depending on the speed of airflow across fin insert portion 234, the diameter of the associated head passage, and other factors. The advantage to this configuration is that it permits using a single cylinder head 200 for left bank 28 and right bank 30 while enabling modification of airflow through each cylinder head 200. The configuration of fin insert portion 234 may be advantageous for increasing or decreasing swirl in combustion chamber 66 while maintaining consistency of swirl, similar to the modifications of airflow described in FIGS. 12-14 hereinbelow.

Fin insert portion 234 works as follows. Intake air flowing from an intake manifold portion flows into first head inlet opening 202 or second head inlet opening 204. As the intake air enters first head inlet opening 202 or second head inlet opening 204, the intake air contains either clockwise or counterclockwise swirl. As the intake air flows over flat planar portion 242, the intake air swirl is eliminated. As the intake air flows longitudinally along either first head passage 212 or second head passage 214, longitudinal portions 236 will induce a controlled amount of swirl in the intake air. The direction of the swirl depends on the direction of deformation of longitudinal portions 236, which means that the swirl induced by longitudinal portions 236 may be either clockwise or counterclockwise. The magnitude of insert angle 238 determines the magnitude of the induced swirl. As previously noted, insert angle 238 may be in the range plus or minus ten degrees, but may be in the range plus or minus thirty degrees. One reason for these ranges is that, depending on the dimensions of the associated head passage, fin insert portion 234 may present a pressure drop to intake air flow as insert angle 238 increases, reducing the efficiency of engine 10.

Figure 12:
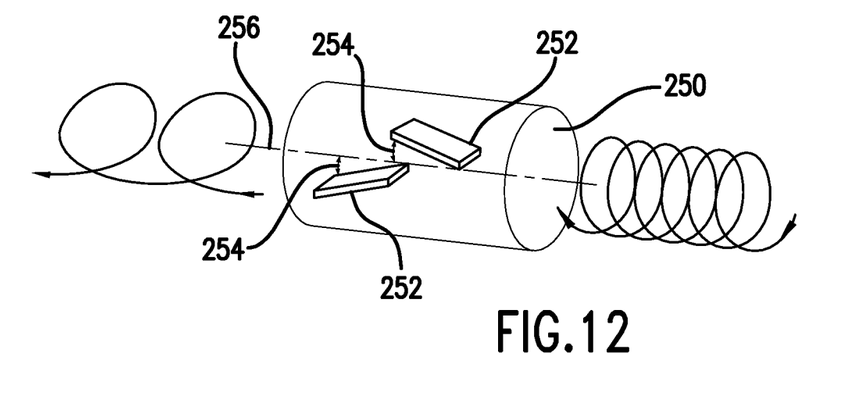
FIG. 12 is a perspective view of a transverse airflow passage in accordance with a fifth exemplary embodiment of the present disclosure.

Referring to FIG. 12, a fifth exemplary embodiment of the present disclosure is shown. For simplicity in explanation, only a representation of a first transverse airflow passage 250 including a longitudinal first transverse passage axis 256 is shown. One or more fin or rib portions 252 extend into first transverse airflow passage 250 and longitudinally along first transverse airflow passage 250 at a fin or rib angle 254 with respect to first transverse passage axis 256 of transverse airflow passage 250. In an exemplary embodiment, fin or rib angle 254 is in the range zero to ten degrees, but may be in the range zero to thirty degrees, depending on factors described hereinabove. The benefit of the configuration shown is that if a clockwise swirl encounters fin or rib portions 252, the amount of swirl is reduced, but remains clockwise. Fin or rib portions 252 may be inserted from an end of first transverse airflow passage 250, may be cast into airflow passage 250, or may be attached to an interior wall forming first transverse airflow passage 250.

Figure 13:
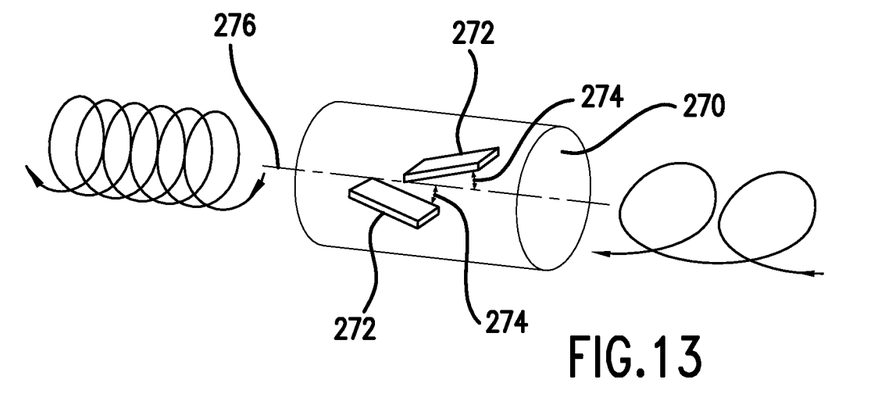
FIG. 13 is a perspective view of a transverse airflow passage in accordance with a sixth exemplary embodiment of the present disclosure.

Referring to FIG. 13, a sixth exemplary embodiment of the present disclosure is shown. For simplicity in explanation, only a representation of a first transverse airflow passage 270 including a longitudinal first transverse passage axis 276 is shown. One or more fin or rib portions 272 extend into first transverse airflow passage 270 and longitudinally along first transverse airflow passage 270 at a fin or rib angle 274 with respect to first transverse passage axis 276 of first transverse airflow passage 270. In an exemplary embodiment, fin or rib angle 274 is in the range zero to ten degrees, but may in the range zero to thirty degrees, as described hereinabove. The benefit of the configuration shown is that if a low clockwise swirl encounters ribs 272, the amount of swirl is increased, but remains clockwise. Such an increase may be beneficial when entering combustion chamber 66. The fin or rib portions 272 may be inserted from an end of first transverse airflow passage 270, may be cast into first transverse airflow passage 270, or may be attached to an interior wall forming first transverse airflow passage 270.

Figure 14:
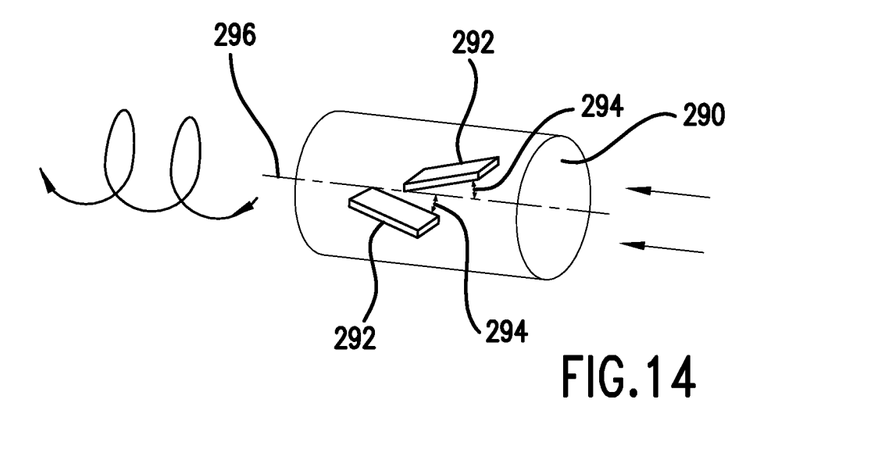
FIG. 14 is a perspective view of a transverse airflow passage in accordance with a seventh exemplary embodiment of the present disclosure.

Referring to FIG. 14, a seventh exemplary embodiment of the present disclosure is shown. For simplicity in explanation, only a representation of a first transverse airflow passage 290 including a longitudinal first transverse passage axis 296 is shown. One or more fin or rib portions 292 extend into first transverse airflow passage 290 and longitudinally along first transverse airflow passage 290 at a fin or rib angle 294 with respect to first transverse passage axis 296 of first transverse airflow passage 290. In an exemplary embodiment, fin or rib angle 294 is in the range zero to ten degrees, but may be in the range zero to thirty degrees. The benefit of the configuration shown is that if airflow having no swirl encounters fin or rib portions 292, swirl is introduced into the airflow. Depending on the direction of the angles of fin or rib portions 292, the introduction of swirl may be either clockwise or counterclockwise. Such an introduction of swirl may be beneficial when entering combustion chamber 66. Fin or rib portions 292 may be inserted from an end of first transverse airflow passage 290, may be cast into first transverse airflow passage 290, or may be attached to an interior wall forming first transverse airflow passage 290.

While the embodiments of FIGS. 12, 13, and 14 describe fin or rib angles as being in the range zero up to thirty degrees, more broadly, the fin or rib angles of the various fin or rib portions described herein may be adjusted to vary the amount of swirl in combustion chamber 66. A zero degree fin or rib angle, which corresponds to a fin or rib portion extending along the axis of an airflow passage, yields little or no swirl in the airflow that enters combustion chamber 66. Increasing the angle of a fin or rib portion with respect to the longitudinal axis increases swirl or reduces swirl, depending on the direction of the fin or rib angle. Furthermore, because a fin or rib portion may be angled in either direction, i.e., either clockwise or counterclockwise when viewing a fin or rib portion long its length, then the fin or rib angle of a fin or rib portion may be in the range −30 degrees to +30 degrees, depending on the desired effect on airflow. While the angles shown are generally flat or fixed angles, the various fin and rib configurations may also be formed in a spiral, helical, or corkscrew type shape, as long as the angle ranges are observed and the dimensions of the fin and rib configuration meet the dimensional requirements described hereinbelow.

Figure 15:
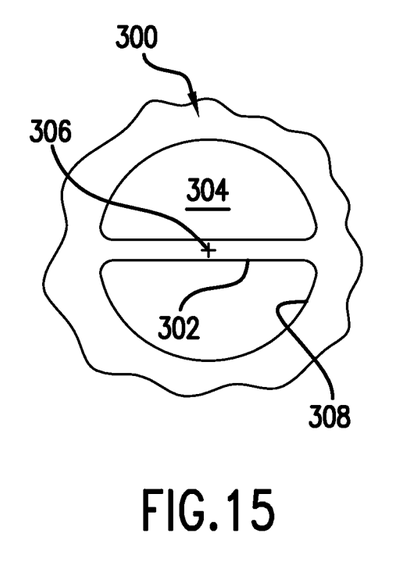
FIG. 15 is an end view of a transverse airflow passage in accordance with an eighth exemplary embodiment of the present disclosure.

Referring to FIG. 15, an eighth exemplary embodiment of the present disclosure is shown. The description of this embodiment is limited to the first transverse airflow passage for simplicity. An intake manifold portion 300 includes a first passage interior surface 308 that forms a first transverse airflow passage 304 including a first transverse passage axis 306 and a fin or rib portion 302 extending from one side of first transverse airflow passage 304 to an opposite side of first transverse airflow passage 304. Fin or rib portion 302 may positioned within first transverse airflow passage 304 as described hereinabove, using a forming technique such as casting, inserted into one or more grooves, or held and attached using a process such as welding. The primary advantage to fin or rib portion 302 may be in the ease of installing fin or rib portion 302.

Figure 16:
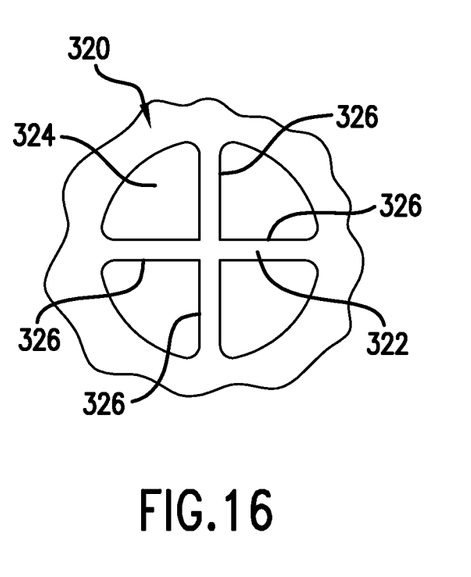
FIG. 16 is an end view of a transverse airflow passage in accordance with a ninth exemplary embodiment of the present disclosure.

Referring to FIG. 16, a ninth exemplary embodiment of the present disclosure is shown. The description of this embodiment is limited to the first transverse airflow passage for simplicity. An intake manifold portion 320 includes a first transverse airflow passage 324 and a fin or rib portion 322 that includes a plurality of wall portions 326 that extend from intake manifold portion 320. Fin or rib portion 322 may be positioned or formed within first transverse airflow passage 324 as previously described. While four wall portions 326 are shown, any number of wall portions 326 may be included as long as wall portions 326 do not provide an excessive pressure drop to airflow passing across fin or rib portion 322.

Figure 17:
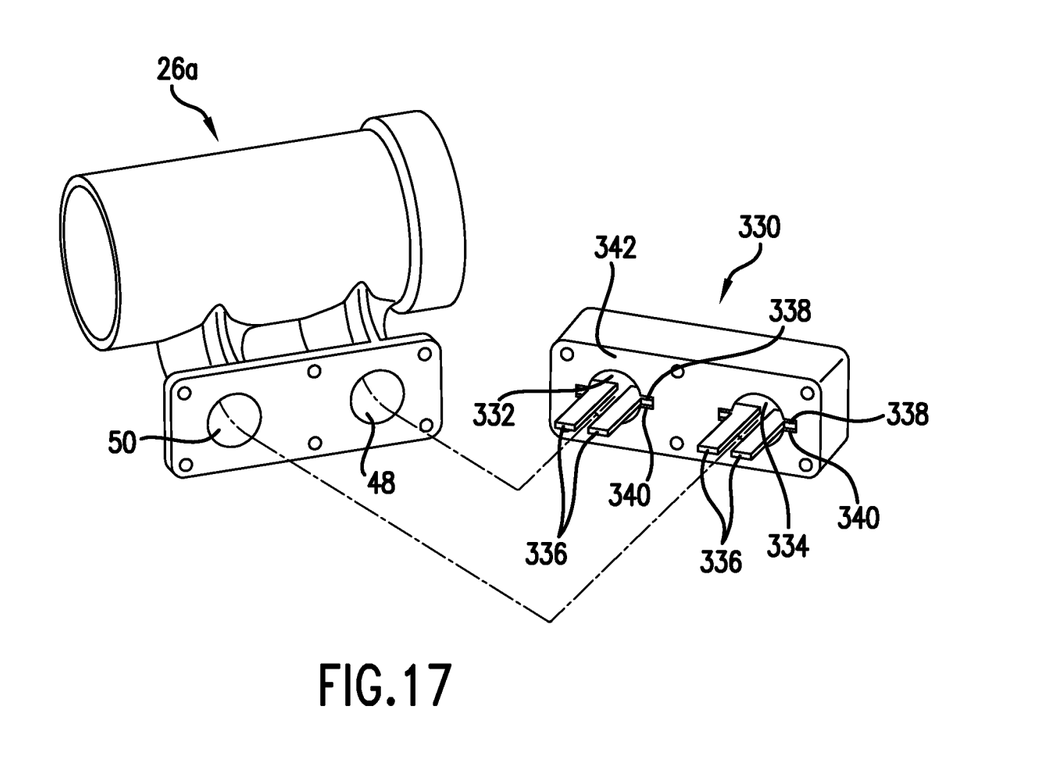
FIG. 17 is an exploded perspective view of a manifold portion and a spacer portion in accordance with a tenth exemplary embodiment of the present disclosure.

Referring to FIG. 17, a tenth exemplary embodiment of the present disclosure is shown. A spacer portion 330 includes a planar surface 342, a first spacer passage 332 that extends longitudinally away from planar surface 342 into spacer portion 330, and a second spacer passage 332 that extends longitudinally away from planar surface 342 into spacer portion 330. Spacer portion 330 is sized and configured to be positioned between intake manifold portion 26a or 26b and combustion chamber 66. The position of first spacer passage 332 and second spacer passage 334 is such that when intake manifold portion 26a or 26b is attached to cylinder head 16, intake air is able to flow from first transverse airflow passage 48 into and through first spacer passage 332, then into first head passage 68 of cylinder head 16, and then into combustion chamber 66. Intake air is similarly able to flow from second transverse airflow passage 50 into and through second spacer passage 334, then into second head passage 70 of cylinder head 16, and then into combustion chamber 66. Spacer portion 330 also includes a plurality of fin or rib portions 336 that are positioned at least partially within first spacer passage 332 and second spacer passage 334 and may include an interface portion 338 the mates with a slot or groove 340 to secure fin or rib portions 336 to prevent movement of fin or rib portions 336. Fin or rib portions 336 extend longitudinally away from planar surface 342 of spacer portion 330, and may extend perpendicularly to planar surface 342. When spacer portion 330 is attached to intake manifold portion 26a or intake manifold portion 26b, fin or rib portions 336 extend into and longitudinally along first transverse airflow passage 48 and second transverse airflow passage 50. The advantage of the tenth embodiment is that it permits the use of all current engine components while achieving the benefits of the present disclosure described hereinabove. Furthermore, installation of the fin or rib portions is greatly simplified since they are securely attached to spacer portion 330 prior to insertion into first transverse airflow passage 48 and second transverse airflow passage 50. However, spacer portion 330 may only be used in applications that permit moving intake manifolds 22 further from engine body plane 32.

Figure 18:
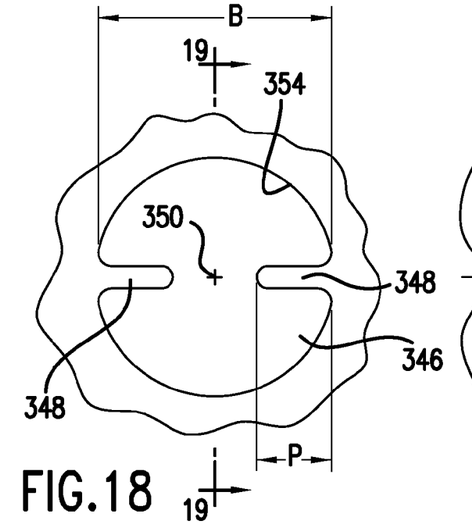
FIG. 18 is an end view of a transverse airflow passage showing certain features of the present disclosure.
Figure 19:
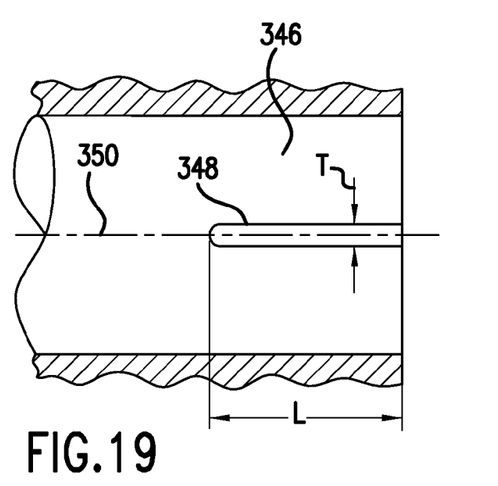
FIG. 19 is a sectional view of the transverse airflow passage of FIG. 17 along the lines 18-18.

To provide for optimum effectiveness, the fin or rib portions of the various embodiments described herein may be associated with certain dimensional ranges. Referring to FIGS. 18 and 19, a portion of an intake manifold portion 352 including an interior wall 354 that forms a longitudinal first transverse airflow passage 346, including a first transverse passage axis 350 and having a bore diameter B, is shown to illustrate exemplary dimensions suitable for use with the embodiments described hereinabove. One or more fin or rib portions 348 having a thickness T extend from interior wall 354 into airflow passage 346 a distance or width P and along airflow passage 346 a length L. Fin or rib portions 348 illustrate exemplary dimensions suitable for use with the embodiments described hereinabove. Dimensions P, T, L, and B operate best when meeting the requirements of equations (1), (2), and (3).

$$0.10 \leq \frac{P}{B} \leq 0.40 \quad \text{Equation (1)}$$

$$0.10 \leq \frac{T}{P} \leq 0.40 \quad \text{Equation (2)}$$

$$0.60 \leq \frac{L}{B} \leq 3.00 \quad \text{Equation (3)}$$

In an exemplary embodiment, the ratio of equation (1) is at an optimal value at 0.25, the ratio of equation (2) is at an optimal value at 0.25, and the ratio of equation (3) is at an optimal value at 1.0. As previously noted, another aspect of the present disclosure is the need to minimize pressure drop. Thus, the thinnest fin or rib portion possible is desirable while maintaining the strength and ability to form the fin or rib portion through the appropriate manufacturing process. In an exemplary embodiment, the fin or rib portions described hereinabove are configured in accordance with equation (4).

$$0.02 \leq \frac{T}{B} \leq 0.20 \quad \text{Equation (4)}$$

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. An internal combustion engine, comprising:
an engine body including a plurality of left bank combustion chambers and a plurality of right bank combustion chambers; and
a first intake manifold positioned on the left bank side and a second intake manifold positioned on the right bank side, each of the first and second intake manifolds attached to the engine body and including a longitudinally extending airflow passage, a body interior surface forming the longitudinally extending airflow passage, a plurality of inlet openings formed in the body interior surface, a plurality of outlet openings, and a plurality of passage interior surfaces, each passage interior surface forming a transverse airflow passage, each of the plurality of transverse airflow passages extending between at least one of the plurality of inlet openings and at least one of the plurality of outlet openings and including a longitudinal transverse passage axis, including at least one groove formed in each passage interior surface and extending in a direction along the longitudinal transverse passage axis, the longitudinal transverse passage axis curved to form a transverse passage angle, the transverse airflow passage positioned to intersect the longitudinally extending airflow passage at a transverse passage connection angle, further including a fin insert portion positioned in the at least one groove, the fin insert portion extending radially inward from the passage interior surface into the transverse airflow passage.

2. The internal combustion engine of claim 1, a pair of grooves formed in the passage interior surface and extending longitudinally along the longitudinal transverse passage axis, and the fin insert is positioned in the pair of grooves.

3. The internal combustion engine of claim 1, the at least one fin being shaped and sized so as to increase uniformity of combustion between cylinders.

4. The internal combustion engine of claim 1, the at least one fin being shaped and sized so as to increase uniformity of combustion between the left and right cylinder banks.

5. The internal combustion engine of claim 1, the at least one fin being shaped and sized so as to increase uniformity of charge flow provided to the cylinders.

6. The internal combustion engine of claim 5, the at least one fin being shaped and sized so as to increase uniformity of swirl of the charge flow provided to the cylinders.

7. An internal combustion engine, comprising:
an engine body including a plurality of left bank combustion chambers, a plurality of right bank combustion chambers, and a plurality of cylinder heads positioned to cover the left bank combustion chambers and the right bank combustion chambers, each of the plurality of cylinder heads including a plurality of head inlet openings and a plurality of head interior surfaces, each head interior surface forming a head passage, each head passage including a longitudinal head passage axis and connecting at least one head inlet opening to at least one combustion chamber;
a first intake manifold positioned on the left bank side and a second intake manifold positioned on the right bank side, each of the first and second intake manifolds attached to the engine body and including a longitudinally extending airflow passage, a body interior surface forming the longitudinally extending airflow passage, a plurality of inlet openings formed in the body interior surface, a plurality of outlet openings, and a plurality of passage interior surfaces, each passage interior surface forming a transverse airflow passage, each transverse airflow passage extending between at least one of the plurality of inlet openings and at least one of the plurality of outlet openings and including a longitudinal transverse passage axis, the longitudinal transverse passage axis curved to form a transverse passage angle, the transverse airflow passage positioned to intersect the longitudinally extending airflow passage at a transverse passage connection angle, each outlet opening positioned to connect at least one longitudinally extending airflow passage with at least one head passage; and
at least one groove formed in at least one of each group including the passage interior surface and the head interior surface extending between each inlet opening and each combustion chamber, the at least one groove extending in a direction along at least one of the longitudinal transverse passage axis and the longitudinal head passage axis, further including a fin insert portion positioned in the at least one groove, the fin insert portion extending radially inward from at least one of the passage interior surface and the head interior surface into the respective transverse airflow passage or head passage.

8. The internal combustion engine of claim 7, the at least one fin being shaped and sized so as to increase uniformity of combustion between cylinders.

9. The internal combustion engine of claim 7, the at least one fin being shaped and sized so as to increase uniformity of combustion between the left and right cylinder banks.

* * * * *